Patented Dec. 30, 1924.

1,521,283

UNITED STATES PATENT OFFICE.

STERLING H. DIGGS, OF WHITING, INDIANA, ASSIGNOR TO STANDARD OIL COMPANY, OF WHITING, INDIANA, A CORPORATION OF INDIANA.

ART OF REFINING OILS.

No Drawing. Application filed January 31, 1921. Serial No. 441,446.

*To all whom it may concern:*

Be it known that I, STERLING H. DIGGS, a citizen of the United States, residing at Whiting, in the county of Lake and State of Indiana, have invented a new and useful Improvement in the Art of Refining Oils, of which the following is a specification.

The present invention relates to the art of refining hydrocarbon oils, and more particularly to improvements therein directed towards the character of the sludge formed and its utilization. The invention will be fully understood from the following description thereof.

In the refining of petroleum oils, and more particularly those intended for lubricants, the oil is treated with sulfuric acid, which may be of 66° Bé. strength or slightly weaker, the amount of the latter used varying from one-third pound to one pound of the treating acid per gallon of oil. As a result of such acid treatment a sludge is produced, which separates from the body of oil. In order to effect the proper utilization of the sludge, which contains valuable asphaltic and tarry substances and sulfocompound, it is necessary that it be caused to stratify readily. In my prior application Serial No. 268,071, filed December 23, 1918, I have described a method of effecting the stratification of such sludge by the use of fuming acid sludge; that is the sludge obtained by the treatment of hydrocarbon oils with fuming sulfuric acid, this sludge containing a considerable proportion of watersoluble sulfonic acids.

In accordance with the present invention, the acid treatment of the oil is so carried out as to produce a sludge of such character as to stratify readily without the addition of fuming acid sludge or its equivalent. In order that the invention may be clearly understood, it will be described in connection with the treatment of a specific type of oil, for example, that known as steam refined stock. This type of oil is the bottom or residue obtained by distilling off from fifteen to forty per cent. of a crude oil, for example, a mid-continent crude, by fire and steam. The oil to be treated is placed in an agitator, and a suitable proportion of treating acid (sulfuric acid of 66° Bé. or slightly weaker) is added and the mixture agitated. Before the sludge is removed, a quantity of fuming sulfuric acid is added, the mixture again agitated and the sludge allowed to separate from the oil.

The quantities of treating acid and of fuming acid may be varied in accordance with the character of the treat desired. The total quantity of the two acids added may be such as to correspond to from one-third pound to one pound of treating acid per gallon of the oil. The proportion of fuming acid may suitably be from 4 to 25% of the quantity of treating acid. Thus, if a heavy treat is desired, as is the case, for example, in preparing oil to be filtered for the production of a light colored lubricant or cylinder oil, for each 100 gallons of oil about 71 pounds of 66° Bé. may be employed, and followed by about 8 pounds of fuming acid (104½%). The total acid used will be approximately the equivalent of 80 pounds of treating acid per 100 gallons of oil.

The treated oil and sludge are allowed to settle, the sludge thereby separating. The sludge is drawn off and its stratification is effected, for example, as hereinafter described.

The sludge is pumped into an agitator or separator containing hot water or hot weak sulfuric acid (below 8° Bé.). The quantity of water or weak acid may suitably be from 10 to 15% of the amount of sludge. It is readily apparent that the reverse mode of mixing may be used if desired. If desired, a heavy hydrocarbon oil, for instance gas oil or fuel oil, which is a mixture of petroleum oils having a boiling point of approximately from 500 to 700° F., may be added to the mixture of sludge and water, for example, in the proportions of from 20 to 50% of the sludge.

The mixture thus produced is preferably heated to form 180 to 212°, and allowed to stand. It readily stratifies, the sulfuric acid contained therein largely separating out at the bottom in a form of about 30° Bé. acid. This acid is now drawn off, more water or weak acid added and the mixture again steamed, after which there is a second stratification and a further quantity of acid of a gravity less than 30° Bé. may be drawn off. This process may be repeated until the gravity of the acid recovered is from 6 to 10° Bé., beyond which stage it is unnecessary to continue.

The product remaining in the separator after removal of the weak acid forms two layers. The upper layer, designated tar, consists of a solution of asphaltines in the gas oil used. The lower layer consists of asphaltic products and mineral oil sulfonic acids, and contains in addition from 20 to 30% of weak sulfuric acid (8 to 10° Bé.) together with small quantities of oil. Both the upper and lower layers are suitable for the production of commercial asphalts or pitches, the best results being secured by treating each layer separately by the method best suited to its character. This stratification, of course, takes place in the sludge above the diluted acid, if the latter be not drawn off, as above set forth.

It is readily apparent that the present invention may be employed in connection with the lighter acid treats of steam refined stocks when intended for subsequent fire and steam distillation, and that it may likewise be used in the treatment of overhead stocks, for example lubricant stock, either with light or heavy acid treats.

As hereinafter stated, the proportion of fuming acid in the total acid used may vary within quite wide limits. It should be observed, however, that the precise proportion used should be controlled by the following considerations. The larger the proportion used, the more rapidly the oil sludge separates or stratifies into the two layers, but the more difficult it is to recover the acid therefrom, particularly the weaker acid resulting from successive additions of water and steam. Conversely, the smaller the proportion of fuming acid employed the slower the separation of the oil sludge, and the greater the facility with which the acid may be removed therefrom. In any particular case the most desirable proportions for use may readily be determined by a trial test.

It is not intended that the precise details of procedure hereinbefore set forth shall be regarded as limitations upon the scope of the invention, as they are given solely for the purpose of illustrating and clearly setting forth the invention.

I claim:

1. The process of acid treating hydrocarbon oil for the formation of readily stratifying sludges which comprises subjecting the oil to the action of sulfuric acid; subsequently, and before removing the sludge, adding fuming sulfuric acid to the oil, and separating the resulting combined sludge.

2. The process of acid treating hydrocarbon oil for the formation of readily stratifying sludges which comprises subjecting the oil to the action of sulfuric acid; subsequently, and before removing the sludge, adding 4 to 25% (based on treating acid) of fuming sulfuric acid to the oil and separating the resulting combined sludge.

3. The process of acid treating hydrocarbon oil for the formation of readily stratifying sludges which comprises subjecting the oil to the action of sulfuric acid; subsequently, and before removing the sludge, adding 4 to 25% (based on treating acid) of fuming sulphuric acid to the oil, the combined quantities of treating and fuming acid being substantially equivalent to the quantity of treating acid required to give the desired treat, and separating the resulting combined sludge.

4. The method of acid treating a residual hydrocarbon oil for the formation of readily stratifying sludges which comprises subjecting such oil to the action of sulfuric acid; subsequently, and before removing the sludge, adding 4 to 25 per cent (based on treating acid) of fuming sulphuric acid to the oil and separating the resulting combined sludge.

5. In the acid refining of hydrocarbon oils, subjecting the oil to the action of sulfuric acid; subsequently, and before removing the sludge, adding fuming sulphuric acid to the oil; separating the combined sludge; intimately mixing the separated sludge with heated water and settling the mix, whereby stratification takes place.

6. In the acid refining of hydrocarbon oils, subjecting the oil to the action of sulfuric acid; subsequently, and before removing the sludge, adding fuming sulphuric acid to the oil, the quantity of fuming acid being from 4 to 25% of the treating acid, separating the combined sludge, washing acid therefrom and settling the remainder to effect stratification.

7. In the acid refining of hydrocarbon oils, subjecting the oil to the action of sulfuric acid; subsequently, and before removing the sludge, adding fuming sulphuric acid to the oil, the quantity of fuming acid being from 4 to 25% of the treating acid, the combined quantity of treating and fuming acids being substantially equivalent to the quantity of treating acid required to give the desired treat, separating the combined sludge, washing acid therefrom and settling the remainder to effect stratification.

STERLING H. DIGGS.